No. 632,545. Patented Sept. 5, 1899.
T. S. WILES.
SAD IRON HEATER.
(Application filed May 6, 1899.)

(No Model.) 2 Sheets—Sheet 1.

Witnesses
L. C. Hills
Alfred T. Page

Inventor:
Thomas S. Wiles,
By E. B. Stocking
Attorney

THE NORRIS PETERS CO., PHOTO-LITHO., WASHINGTON, D. C.

No. 632,545. Patented Sept. 5, 1899.
T. S. WILES.
SAD IRON HEATER.
(Application filed May 6, 1899.)
(No Model.) 2 Sheets—Sheet 2.

Witnesses
L. C. Hills.
Alfred T. Gage.

Inventor:
Thomas S. Wiles,
By E. B. Stocking
Attorney

UNITED STATES PATENT OFFICE.

THOMAS S. WILES, OF ALBANY, NEW YORK.

SAD-IRON HEATER.

SPECIFICATION forming part of Letters Patent No. 632,545, dated September 5, 1899.

Application filed May 6, 1899. Serial No. 715,852. (No model.)

*To all whom it may concern:*

Be it known that I, THOMAS S. WILES, a citizen of the United States, residing at Albany, in the county of Albany, State of New York, have invented certain new and useful Improvements in Sad-Iron Heaters, of which the following is a specification, reference being had therein to the accompanying drawings.

This invention relates to sad-iron heaters, and more particularly to a casing adapted to contain such a heater and to prevent the radiation of heat therefrom.

The invention has for an object to provide a casing having an outlet-aperture adapted to convey the heat radiated from the burner, and thus maintain the case in a comparatively cool condition.

A further object of the invention is to supply such a casing with a burner-chamber adapted to receive and contain the burner and provided with an outlet by and through which the products of combustion and surplus heat may be conveyed from the burner-chamber.

The invention has for a further object to provide novel and improved means for supporting the heater and for supplying thereto the fuel for combustion and the necessary air to promote a circulation between the burner-chamber and the casing to maintain the latter in a cool condition and prevent radiation of heat from the chamber where the heater is located.

Other objects and advantages of the invention will hereinafter appear in the following description and the novel features thereof will be particularly pointed out in the appended claims.

Figure 1:
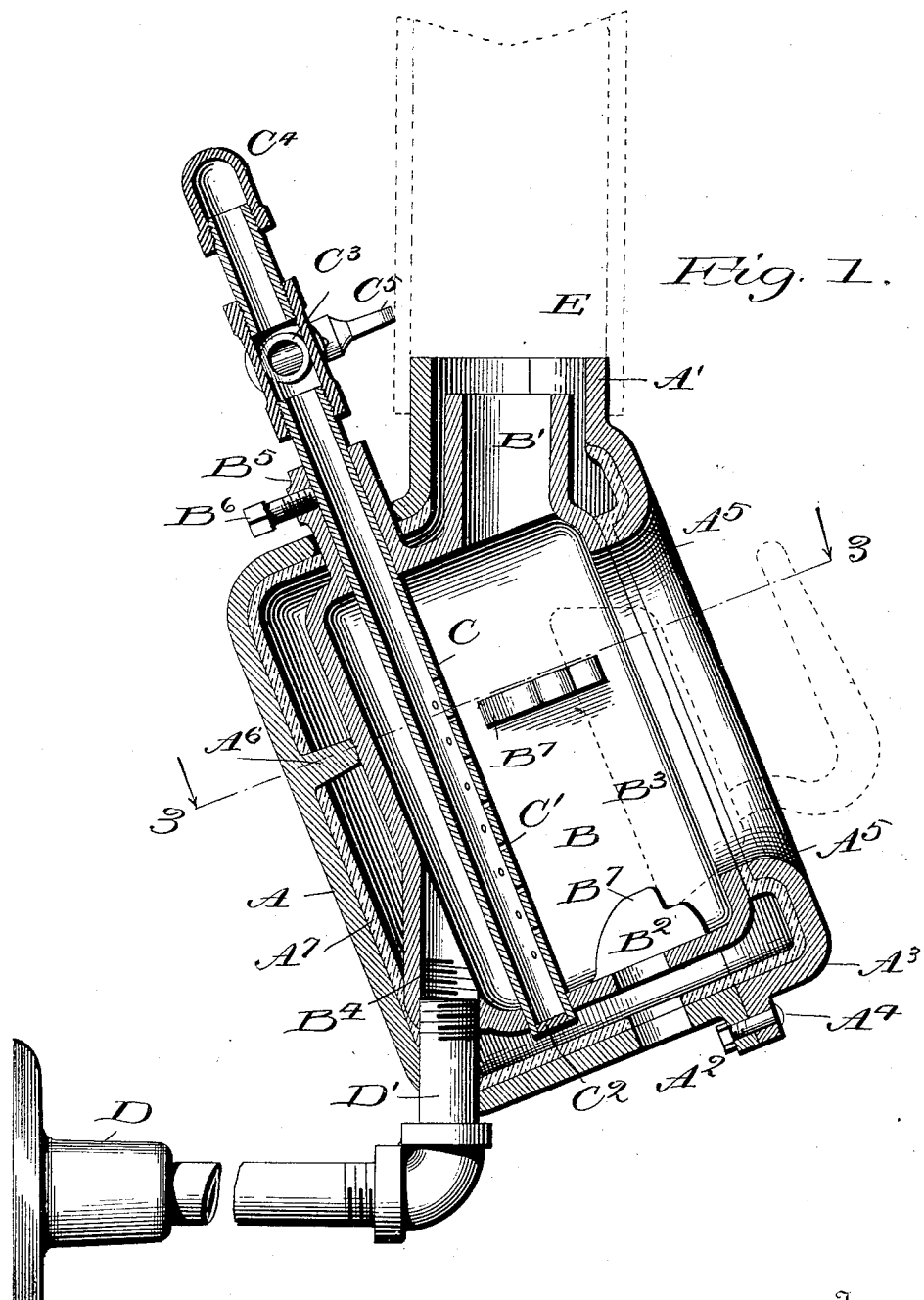
Figure 2:
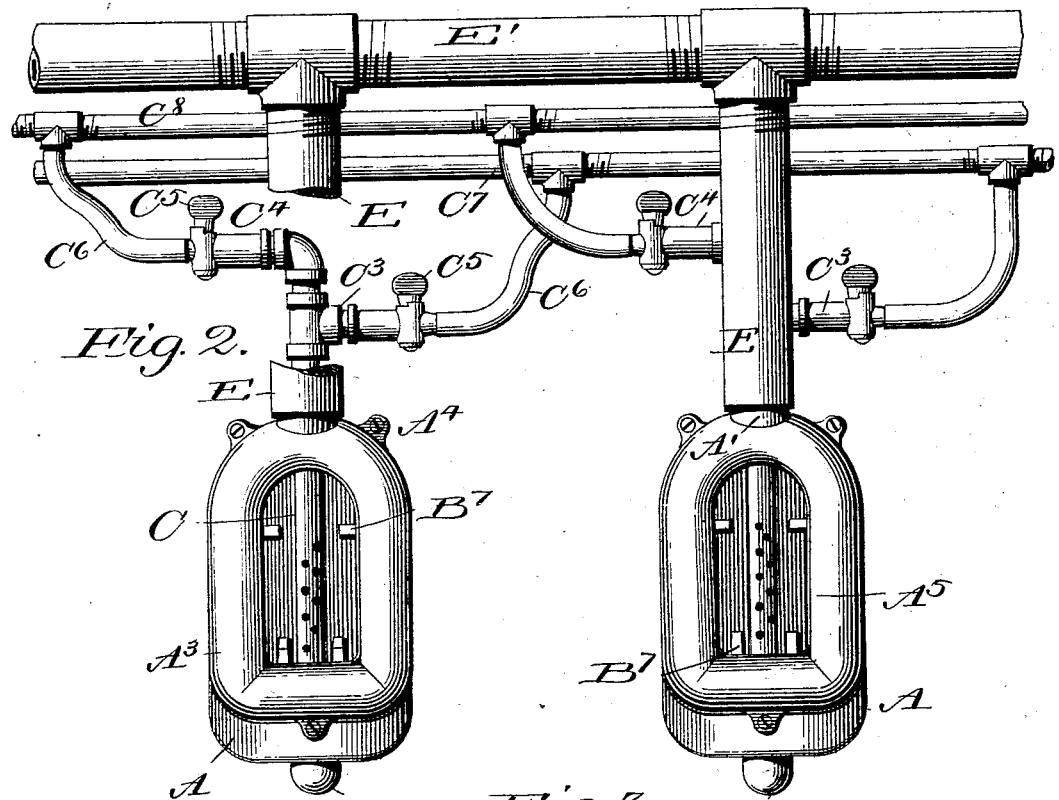
Figure 3:
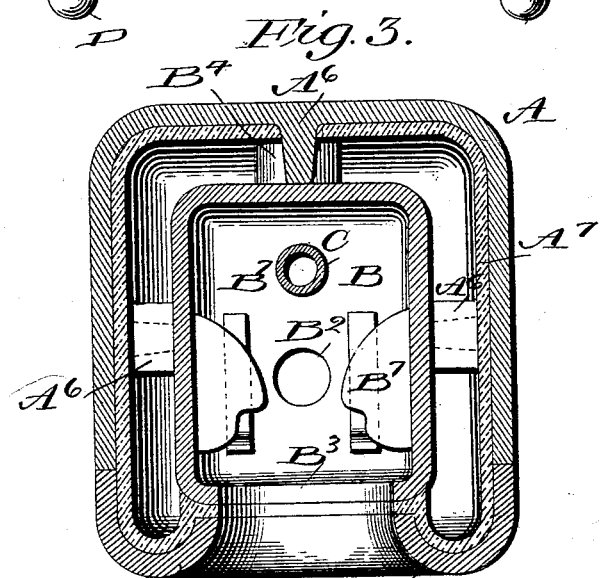

In the drawings, Figure 1 is a vertical section through the heater with the conducting-pipe shown in dotted lines. Fig. 2 is an elevation showing a plurality of heaters connected to a conducting-trunk, a part of one pipe being broken away; and Fig. 3 is a horizontal section on the line 3 3 of Fig. 1.

Like letters of reference indicate like parts throughout the several figures of the drawings.

The letter A designates an outer casing adapted to receive and contain a burner-chamber B, into which a suitable burner C extends. The casing and parts contained therein may be supported by any desired means; but it has been found very convenient to support the same in an inclined position, as shown in Fig. 1, by means of a bracket D, adapted to be attached to a fixed substantially vertical surface. The casing A is provided with an outlet $A'$ for the heated air within the same and with an air-inlet opening $A^2$ at the opposite end from said outlet, while the burner-chamber is provided with a similar outlet $B'$ within the outlet $A'$ and of a smaller diameter. The burner-chamber is also provided with an inlet $B^2$, adapted to supply the necessary air to permit and maintain a proper combustion. The burner-chamber and casing are of such relative dimensions as to leave an air-space between the same, so that the heat radiated from the burner-chamber B causes a current of air through said space, which heated air is conveyed to a point of discharge by any suitable means—for instance, an uptake-tube E. The heater hereinbefore described provides a structure by which the casing may be maintained in a comparatively cool condition and from which no material amount of heat will be radiated to the room.

The details of construction of the several parts may be changed as well as the configuration thereof; but as illustrating a desirable form of the apparatus the casing A has been shown as provided with a removable cover $A^3$, held in position by any suitable means—for instance, bolts $A^4$—and provided at its central portion with an opening conforming substantially to the outline of a sad-iron and provided with inwardly-curved edges or margins $A^5$, whereby when the iron is placed within the receiving-opening said opening is practically closed thereby and the transmission of heat to the apartment or room containing the heater is largely obviated. The casing A is further provided with spacing projections or lugs $A^6$, upon which the burner-chamber B will rest. This chamber is provided with a receiving-opening $B^3$, lying directly beneath the inwardly-curved or rolled walls $A^5$ of the casing, and the walls of the casing or of the burner-chamber may be coated or packed with any suitable non-conducting material, as indicated at $A^7$, which will prevent the ready transmission of heat through the metallic casing or any joints therein. The chamber B is provided on one face with a threaded socket B⁴, adapted to receive a threaded connector D', extending from the bracket D, while at the upper portion of said chamber a neck or collar B⁵ is formed, through which the burner-tube C passes and within which it may be secured by means of a suitable set-screw B⁶ or other device. This chamber is also provided upon its inner walls with seats or brackets B⁷, adapted to support the iron.

The form of burner shown is especially adapted for the use of air and gas and is provided with jet-openings C', formed in the tube C, one end of said tube being suitably stopped or filled by means of a plug C², while at the opposite end of the tube an air connection C³ is provided and a gas connection C⁴. These are provided with any desired form of stopcock C⁵ for regulating the pressure or amount of fuel and are connected by tubing C⁶ with a supply-pipe C⁷, which may contain air under the normal pressure of the atmosphere or under a greater pressure, if desired, and the gas connection with a similar supply-pipe C⁸. It has been found desirable in use to locate a number of these burners above and adjacent to an ironing-table, so that a single supply-pipe extending the length of said table is adapted to furnish the necessary fuel for a number of heaters, while the heat or products of combustion from said heaters are conveyed by tubes E to a main trunk or pipe E' and discharged at any suitable point.

It will be seen that the manner of supporting the heater hereinbefore described maintains the same in an inclined position directly in front of a person handling the iron and the structure of casing around the burner-chamber effectually prevents the radiation or conduction of the heat into the room, thus maintaining the same at a desirable and agreeable temperature, which is very difficult to obtain in laundries where a number of iron-heating devices are in use. Furthermore, the structure of heater occupies but little room, so that it can conveniently be applied in private dwellings and connected with an ordinary gas-fixture, thus providing a means for quickly and effectually heating an iron without raising the temperature of the room to the undesirable degree heretofore necessary with the ordinary structure of heating device. The rolled or inwardly-curved receiving-opening provides a guide for introducing the iron into the burner-chamber and at the same time maintains such a close connection with the edges of an iron as to prevent the escape of any material amount of heat about the edges of said iron. By reason of the upward draft through the inlets A² and B² in connection with the outlet B' gas will not escape outwardly at the iron-receiving opening A⁵, especially when a sad-iron is present in the heater. The structure also provides for the conduction of the surplus heat and products of combustion from the burner-chamber and for maintaining around and about said chamber a current of air by which the casing is rendered cool and a draft maintained to carry all unpleasant odors from unconsumed fuel or gas and radiated heat to a suitable point of discharge.

Having described my invention, what I claim as new, and desire to secure by Letters Patent, is—

1. A sad-iron heater comprising a double-walled casing having an iron-receiving opening and provided with inlet-apertures to admit air to the space between the walls of the casing and to the inner casing, supporting-brackets within the inner casing and beneath the receiving-opening, and a burner beneath said brackets; substantially as specified.

2. A sad-iron heater comprising a double-walled casing forming an inner chamber and surrounding air-space, an inner uptake-opening communicating with the inner chamber, and an outer uptake arranged to communicate with said inner uptake-opening and with the space between the double walls of said case whereby products of combustion and heated air radiated from the inner wall are both conducted from the case; substantially as specified.

3. A sad-iron heater comprising a burner and a double-walled casing having an opening conforming to the shape of a sad-iron and formed of inwardly-curved portions of the outer wall of the heater-case extending to the inner wall thereof, whereby the air-space between the walls is closed at said opening; substantially as specified.

4. An iron-heater comprising a surrounding case provided with inlet and outlet apertures, a burner-chamber within said case and having an outlet-aperture of smaller diameter than that of the case, a burner within said chamber, and means for supporting said chamber and casing; substantially as specified.

5. An iron-heater comprising a surrounding case provided with inlet and outlet apertures, a burner-chamber within said case and having an outlet-aperture of smaller diameter than that of the case, a burner within said chamber, and means for supporting said chamber and casing in a position at an angle to a vertical line; substantially as specified.

6. An iron-heater comprising a surrounding case provided with inlet and outlet apertures, a burner-chamber within said case and having an outlet-aperture of smaller diameter than that of the case, a burner within said chamber, and a bracket connected to said chamber for supporting the same and the casing at an angle to a vertical line; substantially as specified.

7. An iron-heater comprising a casing having inlet and outlet openings, spacing-lugs extending inwardly from the walls of said casing, a burner-chamber having an outlet located within the outlet of said casing, said chamber being spaced from the walls of said casing by said lugs, a burner within said casing, and means for supporting an iron above said burner; substantially as specified.

8. An iron-heater comprising a casing having inlet and outlet openings, spacing-lugs extending inwardly from the walls of said casing, a burner-chamber having an outlet located within the outlet of said casing, said chamber being spaced from the walls of said casing by said lugs, a burner within said casing, means for supporting an iron above said burner, a collar on said chamber, and means carried thereon for maintaining the burner in proper position; substantially as specified.

9. An iron-heater comprising a casing provided with a receiving-opening having inwardly-curved walls, a burner-chamber located beneath said opening and spaced from the walls of said casing so as to leave an air-space, a burner carried by said chamber, and supporting-rests located upon the inner walls of said chamber; substantially as specified.

10. The combination with a heater comprising a casing having inlet and outlet openings and a burner within the same, of a conducting-pipe extending from said outlet-opening to a main or trunk pipe, and a gas-supply pipe connected to said burner; substantially as specified.

11. The combination of a casing provided with inlet and outlet openings, a burner-chamber within the same and communicating with said outlet, a burner within said chamber, a bracket for supporting said chamber and casing, and a conducting-pipe communicating with said outlet; substantially as specified.

12. The combination of a casing having a receiving-opening with inwardly-curved walls, an outlet connection for said casing, inwardly-extending spacing-lugs from the walls of said casing, a burner-chamber within the casing and provided with an outlet within the outlet of the casing, a collar from said chamber, a burner supported within said collar, a socket carried by said casing, a bracket connected to said socket, and rests carried by the walls of said chamber to support an iron above said burner; substantially as specified.

In testimony whereof I affix my signature in presence of two witnesses.

THOMAS S. WILES.

Witnesses:
C. I. BELKNAP,
J. W. GRIFFEN.